US011806691B2

(12) United States Patent
Vaughn et al.

(10) Patent No.: US 11,806,691 B2
(45) Date of Patent: Nov. 7, 2023

(54) ABSORBENT MATERIAL

(71) Applicant: The United States of America, as represented by the Secretary of Agriculture, Washington, DC (US)

(72) Inventors: Steven F Vaughn, Peoria, IL (US); Mark A Berhow, Peoria, IL (US); Sean X Liu, Dunlap, IL (US); Jill K Moser, Morton, IL (US); Gordon W Selling, Dunlap, IL (US); William T Hay, Dunlap, IL (US); Christopher D Skory, Washington, IL (US); Steven C Peterson, Washington, IL (US)

(73) Assignee: The United States of America, as represented by The Secretary of Agriculture, Washington, DC (US)

( * ) Notice: Subject to any disclaimer, the term of this patent is extended or adjusted under 35 U.S.C. 154(b) by 167 days.

(21) Appl. No.: 17/483,489

(22) Filed: Sep. 23, 2021

(65) Prior Publication Data

US 2022/0097021 A1    Mar. 31, 2022

Related U.S. Application Data

(60) Provisional application No. 63/083,498, filed on Sep. 25, 2020.

(51) Int. Cl.
| | |
|---|---|
| *B01J 20/24* | (2006.01) |
| *A01K 1/015* | (2006.01) |
| *B01J 20/02* | (2006.01) |
| *B01J 20/20* | (2006.01) |
| *B01J 20/28* | (2006.01) |
| *B01J 20/30* | (2006.01) |
| *A47G 9/10* | (2006.01) |
| *A47G 27/02* | (2006.01) |

(52) U.S. Cl.
CPC ............. *B01J 20/24* (2013.01); *A01K 1/0155* (2013.01); *B01J 20/0237* (2013.01); *B01J 20/0266* (2013.01); *B01J 20/20* (2013.01); *B01J 20/2803* (2013.01); *B01J 20/28016* (2013.01); *B01J 20/3042* (2013.01); *A47G 9/10* (2013.01); *A47G 27/0206* (2013.01)

(58) Field of Classification Search
None
See application file for complete search history.

(56) References Cited

U.S. PATENT DOCUMENTS

2012/0286195 A1\*  11/2012  Gotou .................. H05K 9/0081
                                                                    252/73

FOREIGN PATENT DOCUMENTS

| CN | 105617999 B | * | 5/2018 |
| CN | 108187629 A | * | 6/2018 |

OTHER PUBLICATIONS

CN 107022412 A (English Language Abstract). (Year: 2017).*
CN 110975824 A (English Language Abstract). (Year: 2020).*

\* cited by examiner

*Primary Examiner* — Joseph D Anthony
(74) *Attorney, Agent, or Firm* — John D. Fado; Maria Restrepo-Hartwig

(57) ABSTRACT

The invention relates to absorbent compositions comprising soybean hulls and soybean hull biochar, methods of preparing such absorbent compositions, and methods of using such compositions in the preparation of articles of manufacture.

14 Claims, 3 Drawing Sheets

ABSORBENT MATERIAL

REFERENCE TO RELATED APPLICATIONS

This application claims the benefit of U.S. Provisional Patent Application No. 63/083,498, filed Sep. 23, 2020. The content of this provisional patent application is hereby expressly incorporated by reference in its entirety.

FIELD OF THE INVENTION

The invention relates to absorbent materials comprising soybean hull and soybean hull biochar, that may further comprise a binding agent, a clumping agent, and/or an odor suppressant agent. The invention also relates to methods of preparing such absorbent materials. The absorbent materials are suitable for a wide variety of uses, and have the ability to absorb water, animal waste, oil, grease, and chemicals.

BACKGROUND OF THE INVENTION

Absorbent materials in granular form are used for a variety of industrial and household purposes. Typical uses include the absorption of oil, grease, and chemicals on floors and elsewhere; absorption of animal waste excreted from pets such as cats, pigs, rats, mice, hamsters, guinea pigs, rabbits, gerbils, and dogs; as carrier for chemicals, such as, pesticides and herbicides; in various agricultural and horticultural applications; and as ground cover.

The three end products resulting from crushing soybeans are oil, meal (protein), and hulls. When processing soybeans to obtain oil and meal, it is necessary to remove the soybean hull, which is separated from the rest of the stream. Soybean hulls tend to be 6 to 8% of the soybean original volume, so processing 100 bushels of soybeans produce about 420 pounds of hulls. Hulls are mostly cellulosic materials. Most manufacturers pelletize the soybean hulls for convenience. Currently, soybean hulls are used, for example, in animal feed, as regenerative absorbents for removing contaminants from wastewater, and as dietary fiber.

Biochar is a carbon-rich material created under anaerobic conditions by the pyrolysis of plant biomass (Laird, D. A., 2008, "The charcoal vision: a win-win scenario for simultaneously producing bioenergy, permanently sequestering carbon, and improving soil and water quality," Agron. J. 100: 178-181). Depending on pyrolysis conditions, biochar can be produced with extremely high porosity with the ability to adsorb large amounts of organic chemicals, such as those compounds associated with cat urine odors (Kearns J. P., et al., 2015, "Meeting multiple water quality objectives through treatment using locally generated char: improving organoleptic properties and removing synthetic organic contaminants and disinfection by-products," J. Water Sanit. Hyg. Dev. 5: 359-372; Dougherty B., et al., 2017, "Can biochar covers reduce emissions from manure lagoons while capturing nutrients?" J. Environ. Qual. 46).

Commercial animal litters, such as cat litter are found made out of a variety of absorbent materials. Roughly 60% of the cat litter sold in the is of the clumping variety, and most of it is made from bentonite clay. Bentonite litters provide some inherent odor control, thanks to their ability to sequester urine and to trap any ammonium produced from urine degradation. To improve odor control, cat litter manufacturers may use a number of additives, including baking soda or activated charcoal to absorb odors, fragrances to mask unpleasant scents, and antibacterial agents to kill odor-causing bacteria. Recently, "crystal" cat litters that promise improved odor control have entered the market. The silica gel used to make these crystals is chemically similar to that used in desiccants. The silica gel crystals in such litters are dotted with tiny pores, allowing the crystals to absorb cat urine, then slowly allow the water to evaporate off. Natural alternatives using ecologically-friendlier biobased materials have become popular replacements for clay-based litters, and in certain areas of the represent the majority of sales. Biobased litters available commercially are composed of a variety of absorbent materials, including bamboo, corn kernels, corncobs, pine sawdust, recycled newspaper, and wheat. Biobased litters also have the advantage over clay litters in that they are biodegradable.

Currently, there is at least one commercial cat litter that contains biochar, Switchgrass Natural Cat litter, which contains wood chip biochar (OURPETS; Fairport Harbor, Ohio, USA). A concern from the use of biochar in cat litters is the release of biochar dust particles, as significant biochar-induced dust emissions have been found from applications of biochar to agricultural fields (Gelardi D. L., et al., 2019, "An emerging environmental concern: biochar-induced dust emissions and their potentially toxic properties," Sci. Total Environ. 678: 813-820). Biochar dust particles less than 10 μm in diameter have been shown to be toxic to mammalian cells in culture (Sigmund G., et al., 2017, "Cytotoxicity of biochar: a workplace safety concern?" Environ. Sci. Technol. Lett. 4: 362-366).

More earth-friendly cat litters currently available in the market are made of corn, grass, pine, recycled paper, recycle wood, walnut shells, and wheat. Activated charcoal and baking soda are sometimes added to these litters to reduce ammonia and fecal odor. Activated charcoal may be obtained from bone char, coconut shells, peat, petroleum coke, coal, olive pits, or saw dust. Wood cat litters make use of reclaimed wood fibers. Pine is a common type of wood used in cat litter, but other woods are also used. The aroma and odor trapping ability of natural wood is one of main reasons for using wood cat litters. Paper litter is made from recycled paper, making it an eco-friendly product, however it has poor clumping ability, and tends to have little longevity. This type of litter doesn't produce any dust, and has minimal tracking, but it has poor odor control. Corn cat litter tends to create super-cohesive clumps. In most cases, corn cat litter also offers great odor control. Corn cat litter has several weaknesses, with the main one being its predisposition to aflatoxin mold growth. The clumps produced by wheat litter are not particularly solid, but the natural enzymes in wheat help neutralize odors. Walnut cat litter forms moderately strong clumps, and has good odor control. The drawback to most of these litters is that the additives used are expensive to make or obtain, generate hazardous waste byproducts during manufacture, and/or fail to break down properly when disposed in landfills. Clumping cat litter produced from solvent-extracted corn dried distillers grains and from Eastern red cedar (Juniperus virginiana L.) have been shown to be odor-reducing and low dust-forming.

There is no mention of a highly absorbent material prepared with soybean hulls and soybean biochar. There is no mention either of the addition of at least one of a binding agent, a clumping agent, an antimicrobial agent, or a mixture thereof to an absorbent material prepared with soybean hull and soybean biochar.

Thus, there is a need for a highly absorbent biodegradable material that can be used to prepare a dust-free and odor-free animal litter that is easy to clean and maintain.

SUMMARY OF THE INVENTION

Provided herein is an absorbent material prepared with soybean hulls and soybean biochar.

In an embodiment, the invention relates to an absorbent material comprising soybean hulls and soybean hull biochar, and optionally comprising at least one of a dust reduction agent, a clumping agent, and an odor-absorbing agent. In some embodiments of the invention, the absorbent material comprises soybean hulls, soybean hull biochar, and at least one of a binding agent, a clumping agent, an odor-absorbing agent, or mixtures thereof. In some embodiments of the invention, the binding agent in the absorbent material of the invention is at least one of mineral oil, beeswax, castor oil, avocado oil, grapeseed oil, or a combination thereof. In some embodiments of the invention, the clumping agent in the absorbent material of the invention is at least one of guar gum, Xanthan gum, tara gum, a hydrocolloid gum, sodium alginate, a latex, a starch, corn syrup, corn syrup solids, *psyllium* husk, chia seeds, flax seed meal, cornstarch, gelatin, agar agar, konjac powder, or a combination thereof. In some embodiments of the invention, the odor-absorbing agent in the absorbent material of the invention is at least one of baking soda, hexadecyl ammonium chloride amylose inclusion complex, or mixtures thereof.

In an embodiment, the invention relates to an article of manufacture prepared with an absorbent material comprising soybean hulls and soybean hull biochar, and optionally comprising at least one of a dust reduction agent, a clumping agent, and an odor-absorbing agent. In some embodiments of the invention, the article of manufacture prepared with an absorbent material of the invention is a sock, a pillow, a spill mat, a spill pad, an industrial rug, a roll, or a boom.

In an embodiment, the invention relates to an article of manufacture prepared with an absorbent material comprising soybean hulls, soybean hull biochar, and at least one of a dust reduction agent, a clumping agent, and an odor-absorbing agent. In some embodiments of the invention, the article of manufacture prepared with the absorbent material of the invention is small pet bedding material or cat litter. In some embodiments of the invention, the article of manufacture prepared with the absorbent material of the invention is formed into pellets, sawdust, or briquettes. In some embodiments of the invention, the small pet bedding material or cat litter prepared with an absorbent material of the invention comprises from about 0% to about 30% soybean hulls, from about 0% to about 60% soybean hull biochar, from about 0% to about 10% of a binding agent, from about 0% to about 10% of a clumping agent, and from about 0% to about 5% odor-absorbing agent. In some embodiments of the invention, the binding agent in the absorbent material of the invention is mineral oil, beeswax, castor oil, avocado oil, grapeseed oil, or mixtures thereof; the clumping agent is guar gum, Xanthan gum, *psyllium* husk, chia seeds, flax seed meal, cornstarch, gelatin, agar agar, konjac powder, or mixtures thereof; and the odor-absorbing agent is baking soda or hexadecyl ammonium chloride amylose inclusion complex. In some embodiments of the invention, the binding material is mineral oil, the clumping material is guar gum, and the odor-absorbing agent is hexadecyl ammonium chloride amylose inclusion complex. In some embodiments of the invention, the article of manufacture prepared with an absorbent material of the invention is a cat litter.

In an embodiment, the invention relates to a method for preparing an absorbent material. The method comprises grinding soybean hulls; and mixing the ground soybean hulls with soybean hull biochar. In some embodiments of the invention, the method for preparing an absorbent material further comprises adding at least one of a binding agent, a clumping agent, an odor-absorbing agent, or mixtures thereof. In some embodiments of the invention, the method for preparing an absorbent material comprises adding from 0% to about 30% soybean hulls, from about 0% to about 60% soybean hull biochar, from about 0% to about 10% of a binding agent, from about 0% to about 10% of a clumping agent, and from about 0% to about 5% of an odor-absorbing agent. In some embodiments of the invention, the method for preparing an absorbent material comprises adding a binding agent that is at least one of mineral oil, beeswax, castor oil, avocado oil, grapeseed oil, or mixtures thereof; adding a clumping agent that is at least one of guar gum, Xanthan gum, *psyllium* husk, chia seeds, flax seed meal, cornstarch, gelatin, agar agar, konjac powder, or mixtures thereof; and adding an odor-absorbing agent that is at least one of baking soda, hexadecyl ammonium chloride amylose inclusion complex, or mixtures thereof.

In an embodiment, the invention relates to a method for preparing an absorbent material comprising adding to soybean hulls and soybean hull biochar mineral oil as the binding agent, guar gum as the clumping agent, and is hexadecyl ammonium chloride amylose inclusion complex as the odor-absorbing agent.

DETAILED DESCRIPTION

Figure 1:
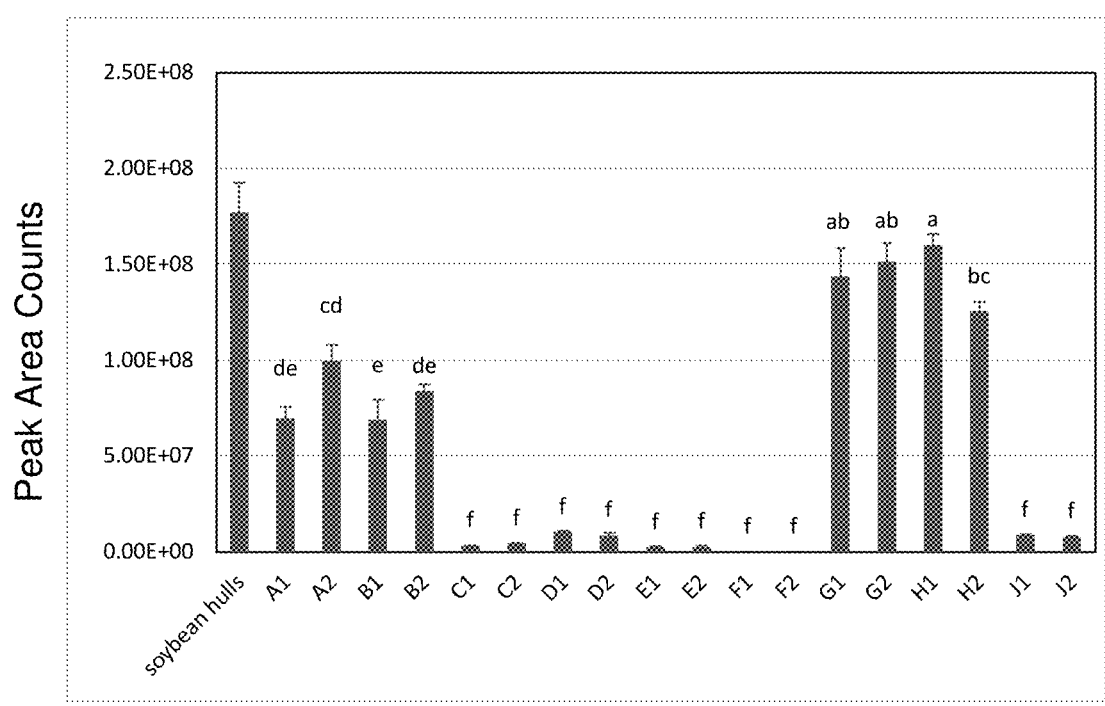
FIG. 1 depicts a graph of the volatile compound peak area counts for different soybean hull-containing cat litters. The Y axis indicates the peak area measured for the 3-mercapto-2-butanol. The X axis indicates the samples. SH: unprocessed ground soybean hulls (SH); A: SH processed as cat litter; B: SH+1% soybean hull biochar (SHB); C: SH+10% SHB; D: SH+250 ppm copper sulfate; E: SH+250 ppm copper sulfate+1% SHB; F: SH+250 ppm copper sulfate+10% SHB; G: SH+3.56 amylose inclusion complex; H: SH+3.56 amylose inclusion complex+1% SHB; J: SH+3.56 amylose inclusion complex+10% SHB. Number after the letter designating the samples indicates: 1=Particles passing through 2.00 mm sieve; 2=particles passing through 0.84 mm sieve. Columns labeled above with the same letter are not significantly different based on differences of least square means.

The invention relates to an absorbent materials comprising soybean hull and soybean hull biochar, that may further comprise a binding agent, a clumping agent, and an odor absorbing agent; and to methods of preparing such absorbent materials. The absorbent materials are suitable for a wide variety of uses, and have the ability to absorb water, animal waste, oil, grease, and chemicals.

The inventors have surprisingly found that addition of soybean biochar to soybean hulls has a synergistic effect on the ability of soybean hulls to absorb water, animal waste, oil, grease, and chemicals.

The global value of pet products has been estimated to hit $269 billion in 2019, with the market for cat litters, both clay and biobased being valued at approximately $3.9 billion, and is expected to reach $5.4 billion in sales by 2025 (Market Watch, 2019). Millennials (those born between 1981 and 1996) constitute the largest group of pet owners in the United States and the European Union, and this group has been reported to be more concerned with the health and well-being of their pets than other demographic groups. Litter boxes containing some type of absorbent material are needed for small animals kept indoors.

Clays used in animal litters are not very eco-friendly: they are a strip-mined, non-renewable resource; they are heavy, which increases transportation costs; their production is an energy-intensive process; they are not bio-degradable even in an aerobic landfill; and they can release dust. Clumping clay litter releases silica dust when stirred up. Silica dust is a known carcinogen. Cat litter made from silica gel crystals is said to be absorbent, control odor, and be dust free. There is no suggestion in the literature that a composition comprising soybean hulls and soybean hull biochar may be used as an absorbent. Similarly, there is no suggestion in the literature that a composition comprising soybean hulls and soybean hull biochar may be altered to function as a clumping animal litter.

In an embodiment, the invention relates to an absorbent material comprising soybean hulls and soybean hull biochar. In some embodiments, the absorbent material may comprise any amount from about 5% to about 95% soybean hulls, and from about 5% to about 95% soybean hull biochar. In some embodiments of the invention, the absorbent material may comprise from about 10% to about 90% soybean hulls, and from about 10% to about 90% soybean hull biochar. In an embodiment, the invention relates to an article of manufacture comprising an absorbent material of the invention. The article of manufacture may be a sock, a pillow, a spill mat, a spill pad, an industrial rug, a roll, or a boom. Absorbent materials may also be reusable absorbents. A pillow is a fabric bag filled with absorbent material, used for rapid absorption of high volumes of liquid in a limited area. A pad is a sheet of absorbent material used to control low-volume spills, to help prevent physical hazards, and to protect surfaces from damaging liquid materials. The absorbent material of the invention may be used to fill absorbent socks. Absorbent socks can be used for a variety of solvents as well as for cleaning up spills on outdoor equipment and machine bases. Socks are used to absorb oil and to wrap machines to prevent spilling on the floor. The absorbent materials of the invention may be poured on the spill's surface, and can absorb a variety of spills including oil, coolants and other solvents. The absorbent materials of the invention have uses in many areas including factories, hospitals, schools, office buildings, gas stations, warehouses and restaurants. Booms and skimmers are ideal for sweeping oil from streams, ponds and other bodies of water to keep them from harming the environment.

In an embodiment, the invention relates to an article of manufacture comprising an absorbent material of the invention. The article of manufacture may be a small pet bedding material, or a cat litter. In some embodiments, the present invention provides an absorbent clumping animal litter composition. When contacted by animal urine, the composition forms one or more clumps, allowing the urine to be conveniently removed from the composition by sifting the clump and any feces away from the non-clumped (e.g., nonwetted) litter, leaving behind substantially unused and fresh litter for further use. In some embodiments, the composition also includes at least one of a binding agent, a clumping agent, and an odor-absorbing agent. A clumping cat litter of the invention comprising a clumping agent has low density, good integrity, and comparable, or better clumping ability to traditional clay clumping litter. This cat litter also has less dust formation than other commercially-available cat litters.

In an embodiment, the invention relates to an absorbent material comprising soybean hulls, soybean biochar, and at least one of a binding agent, a clumping agent, an odor-absorbing agent, or a mixture thereof. In some embodiments of the invention, the binding agent in the absorbent material is at least one of mineral oil, beeswax, castor oil, avocado oil, grapeseed oil, or a mixture thereof. In some embodiments of the invention, the clumping agent in the absorbent material is at least one of guar gum, Xanthan gum, *psyllium* husk, chia seeds, flax seed meal, cornstarch, gelatin, agar agar, konjac powder, or mixtures thereof. In some embodiments of the invention, the odor-absorbing agent in the absorbent material is a baking soda, or a hexadecyl ammonium chloride amylose inclusion complex. The clumping cat litter of the invention may include a fragrance.

In an embodiment, the invention relates to an article of manufacture prepared with an absorbent material comprising soybean hulls, soybean biochar, and at least one of a binding agent, a clumping agent, an odor-absorbing agent, or a mixture thereof. In some embodiments of the invention, the article of manufacture prepared with this absorbent material is a small animal bedding or a cat litter. In some embodiments of the invention, the small animal bedding or cat litter comprises from about 0% to about 30% soybean hulls, from about 0% to about 60% soybean hull biochar, from about 0% to about 10% of a binding agent, from about 0% to about 10% of a clumping agent, and from about 0% to about 5% antimicrobial agent. The cat litter formula of the invention does not have inherent clumping compounds, and will not clump without a clumping agent. Surprisingly, hexadecylammonium chloride amylose inclusion complex was found to prevent oxidation of unsaturated lipids present in the soybean hulls which would otherwise give the cat litter off-odors.

In an embodiment, the invention relates to a method for preparing an absorbent material, the method comprising grinding soybean hulls, and mixing the ground soybean hulls with soybean biochar. In some embodiments of the invention, the method for preparing an absorbent material further comprises adding at least one of a binding agent, a clumping agent, or an odor-absorbing agent. In some embodiments of the invention, the method for preparing an absorbent material comprises adding from 0% to about 30% soybean hulls, from about 0% to about 60% soybean hull biochar, from about 0% to about 10% of a binding agent, from about 0% to about 10% of a clumping agent, and from about 0% to about 5% odor-absorbing agent.

As used herein, the term "about" is defined as plus or minus ten percent of a recited value. For example, about 1.0 g means 0.9 g to 1.1 g.

Unless otherwise explained, all technical and scientific terms used herein have the same meaning as commonly understood by one of ordinary skill in the art to which this disclosure belongs. The singular terms "a", "an", and "the" include plural referents unless context clearly indicates otherwise. Similarly, the word "or" is intended to include "and" unless the context clearly indicate otherwise.

Embodiments of the present invention are shown and described herein. It will be obvious to those skilled in the art that such embodiments are provided by way of example only. Numerous variations, changes, and substitutions will occur to those skilled in the art without departing from the invention. Various alternatives to the embodiments of the invention described herein may be employed in practicing the invention. It is intended that the included claims define the scope of the invention and that methods and structures within the scope of these claims and their equivalents are covered thereby. All publications, patents, and patent applications mentioned in this specification are herein incorporated by reference to the same extent as if each individual publication, patent, or patent application was specifically and individually indicated to be incorporated by reference.

EXAMPLES

Having now generally described this invention, the same will be better understood by reference to certain specific examples, which are included herein only to further illustrate the invention and are not intended to limit the scope of the invention as defined by the claims.

Example 1

Preparation of Soybean Hull/Soybean Hull Biochar Cat Litters

Cat litters were prepared with soybean hulls; soybean hulls+1% soybean hull biochar; soybean hulls+10% soybean hull biochar; soybean hulls+250 ppm copper sulfate; soybean hulls+250 ppm copper sulfate+1% soybean hull biochar; soybean hulls+250 ppm copper sulfate+10% soybean hull biochar; soybean hulls+3.56% w/v amylose inclusion complex; soybean hulls+3.56% w/v amylose inclusion complex+1% soybean hull biochar; and soybean hulls+3.56% w/v amylose inclusion complex+10% soybean hull biochar were tested for their ability to reduce the volatile area peak of 3-mercapto-2-butanol. All the cat litters tested contained guar gum and mineral oil.

Soybean hulls (SH) and pelletized soybean hulls were obtained from Archer-Daniels-Midland (Quincy, Illinois, USA). Guar gum was obtained from Earthbond Elements (American Fork, Utah, USA). Food grade mineral oil was obtained from Dolgencorp LLC. (Goodlettsville, Tennessee, USA). Biochar (SHB) was produced from the pelletized soybean hulls using a top-lit updraft design furnace reaching a maximum temperature of 735° C. during pyrolysis. Residence times vary somewhat between runs, generally about 25 minutes for 7 liters of soybean hulls, with maximum temperature of 735 C during pyrolysis. SHB was ground with a flour mill and sieved through a 30-mesh stainless steel sieve to obtain the product used in the litter formulation. Product used passed through a 2.00 mm sieve, and was retained by a 20-mesh sieve (product was smaller than 2 mm, but larger than 0.85 mm). Hexadecyl ammonium chloride amylose inclusion complex was prepared as described below (W. T. Hay, et al., 2017, "Effect of Spray Drying on the Properties of Amylose Hexadecyl Ammonium Chloride Inclusion Complexes," Carbohydrate Polymers 157: 1050-1056.)

A high-amylose starch dispersion was prepared by adding 1800 mL of deionized water and 100 g of high-amylose corn starch to a 2 L stainless steel Waring blender container (Waring Products division, New Hartford, Connecticut, USA). After mixing, the dispersion was passed through a PENICK & FORD laboratory model steam jet cooker (Penford Corp., Englewood, CO) operating at excess steam conditions (Klem R. S. and Brogly D. A., 1981, "Methods for Selecting the Optimum Starch Binder Preparation System," Pulp Paper 55: 98-103). Temperature in the hydroheater was 140° C., steam back pressure was 380 kPa, and the steam line pressure was 550 kPa. The starch dispersion was pumped through the jet cooker at a rate of 1 L min-1, and was collected in a 4 L stainless steel Waring blender container. A solution of hexadecylammonium chloride was prepared by dispersing 5.25 g of hexadecylamine (7.5% of the weight of amylose in the starch) in 217.42 g of 0.1N HCl (the amount needed to convert the amine to the HCl salt), and then heated to 90° C. This solution was then added to the hot starch dispersion immediately after jet-cooking. The solution was stirred slowly using a Waring blender for 1 minute, and then rapidly cooled in an ice bath until a temperature of 25° C. was attained. As a control, 500 mL of the dispersion was freeze dried for comparison with the spray dried product.

SH (3,920 g), SHB (40 g), and guar gum (40 g) were dry mixed with a Hobart commercial food preparation mixer for 2 minutes before a 3.56% (w/v) hexadecyl ammonium chloride amylose inclusion complex solution (4000 g) was slowly added during stirring to produce a dough. When used, copper sulfate was added as a 1% v/v solution to produce a final concentration of 250 ppm in the litter. The dough was fed into a ZLSP200A pellet mill (Meelko; Miami, Florida, USA) equipped with a 6-mm die to produce pellets. The pellets were dried at 60° C. for 24 hours, ground with the flour mill, and sieved through a series of sieves. Material passing through the 10-mesh and retained on the 20-mesh was used; this was about 95% of the total amount of the material. Guar gum (4% w/w) and mineral oil (2% w/w) were then added to the litter with the mixer. Evaluations for odor reduction, clumping ability, dust formation and hydration capacity were compared against four commercial biobased cat litters, WORLD'S BEST CAT LITTER (Kent Nutrition Group Inc.; Muscatine, Iowa, USA), FELINE PINE (Church & Dwight Co., Inc., Ewing, New Jersey, USA), OUR PET'S Natural Cat Litter with Biochar (OurPet's Co., Fairport, Ohio, USA) and CEDARIFIC (North Eastern Products Corporation; Warrensburg, New York, USA). All but CEDARIFIC are clumping formulations.

Food grade mineral oil (DOLGENCORP LLC; Goodlettsville, Tennessee, USA) was used to reduce dust formation, and to assist in even distribution of guar gum, which was added as clumping agent.

The odor suppression and physical properties of the cat litters prepared above were analyzed, and compared to those of commercial cat litters.

Example 2

Odor Suppression Tests

The ability of soybean hull mixtures to absorb volatile compounds was tested. The results indicated that processed soybean hulls mixed with copper sulfate reduced the volatile area peak of 3-mercapto-2-butanol to undetectable levels, and mixed with amylose inclusion complex reduced the volatile arear peak to very low levels.

Nine different cat litter formulations were tested for odor suppression. The materials were processed with guar gum and mineral oil, as explained in Example 1, above. Cat urine contains several species-specific odor compounds which are used as territorial markers, including the thiol compound 3-mercapto-3-methylbutan-1-ol (MMB) To determine the reduction of MMB by the litter formulations, headspace concentrations were analyzed using solid phase microextraction (SPME) of samples spiked with MMB (98% purity; MilliporeSigma; Burlington, Massachusetts, USA). Headspace vials (10 mL) with screw-cap lids were filled with 0.5 g material. To each vial, 0.2 mL of an MMB solution (1 mg/mL in deionized $H_2O$) was added. Vials were capped and mixed by vortex (speed setting 4.5) on a HEIDOLPH Multi-Reax (Heidolph North America; Elk Grove Village, Illinois, USA) for 1 hour, then allowed to equilibrate for 24 hours at room temperature (20±2° C.). Samples were prepared in triplicate, and three daily check samples consisting of 0.5 g soybean hulls that were ground and passed through a 0.85 mm sieve were prepared with each set of samples. Headspace content of MMB was analyzed on an ISQ gas-chromatograph mass spectrometer (GC-MS) (ThermoFisher Scientific; Waltham, Massachusetts, USA) equipped with a split/splitless injector at 250° C., a TG-Wax column (30 m length, 0.25 mm inner diameter, 0.25 µm phase thickness, ThermoFisher Scientific), a Combi-PAL autosampler (CTC Analytics; Lake Elmo, Minnesota) with an SPME head, and CHROMELEON v7.0 chromatography data system software (ThermoFisher Scientific). The MS was operated in electron ionization mode at 70 eV and 250° C. and scanning mass/charge m/z 35-350. Samples were equilibrated at 30° C. for 5 minutes, then extracted with a SPME fiber for 10 minutes at the same temperature using a 50/30 µm divinylbenzene/Carboxen on polydimethylsiloxane on a STABLEFLEX Fiber (Sigma-Aldrich Co. LLC; Burlington, Massachusetts, USA). The fiber was immediately desorbed in the GC injection port for 7 minutes. Helium was used as carrier gas at a constant flow rate of 1.5 mL/minute. Injection port was splitless until complete desorption followed by a 50 mL/minute split. The oven temperature program was 40° C. for 1 minute, followed by a ramp of 10° C./minute to 240° C. where it was held for 2 minutes. The MMB peak was identified by matching the retention time and mass spectrum to the commercial standard, which was used to produce a standard curve to quantitate MMB levels in the samples. The peak area of MMB was divided by the average peak area in daily check samples in order to normalize the two sets of data.

Nine formulations, with two different particle sizes (particles retained on a 2.00-mm sieve and particles retained on a 0.84-mm sieve) were produced and tested for volatile odor compound suppression. The results are shown in FIG. 1, and in Table 1, below.

TABLE 1

3-mercapto-2 butanol Peak Areas

| Label | Material | Particle Size | Peak Area |
|---|---|---|---|
| SH | Unprocessed soybean hulls | | 1.75E+08 |
| A1 | Processed soybean hulls (SH) | <2.00 mm | 7.50E+07 |
| A2 | SH | <0.84 mm | 1.00E+08 |
| B1 | SH + 1% soybean hull biochar (SHB) | <2.00 mm | 7.50E+07 |
| B2 | SH + 1% SHB | <0.84 mm | 9E+07 |
| C1 | SH + 10% SHB | <2.00 mm | 3.3E+06 |
| C2 | SH + 10% SHB | <0.84 mm | 3.9E+06 |
| D1 | SH + 250 ppm copper sulfate | <2.00 mm | 1.1E+07 |
| D2 | SH + 250 ppm copper sulfate | <0.84 mm | 1.0E+07 |
| E1 | SH + 1% SHB + 250 ppm copper sulfate | <2.00 mm | 3.4E+06 |

TABLE 1-continued 3-mercapto-2 butanol Peak Areas

| Label | Material | Particle Size | Peak Area |
|---|---|---|---|
| E2 | SH + 1% SHB + 250 ppm copper sulfate | <0.84 mm | 3.8E+06 |
| F1 | SH + 10% SHB + 250 ppm copper sulfate | <2.00 mm | No peak detected |
| F2 | SH + 10% SHB + 250 ppm copper sulfate | <0.84 mm | No peak detected |
| G1 | SH + 3.56% (w/w %) amylose inclusion complex | <2.00 mm | 1.5E+08 |
| G2 | SH + 3.56% amylose inclusion complex | <0.84 mm | 1.4E+08 |
| H1 | SH + 1% SHB + 3.56% amylose inclusion complex | <2.00 mm | 1.7E+08 |
| H2 | SH + 1% SHB + 3.56% amylose inclusion complex | <0.84 mm | 1.2E+08 |
| J1 | SH + 10% SHB + 3.56% amylose inclusion complex | <2.00 mm | 9.6E+06 |
| J2 | SH + 10% SHB + 3.56% amylose inclusion complex | <0.84 mm | 9.6E+06 |

The particle size of the different litters did not appear to play a role in odor absorbance.

While litters containing copper sulfate showed very good volatile odor suppression, in the absence of the amylose inclusion complex in the recipe, the litter started developing an oxidized lipid odor after a few weeks. Thus, a cat litter with amylose inclusion complex was chosen for development.

Example 3

Absorbent Material Properties

The bulk density, hydration capacity, dust formation, and clumping percentage were determined for an absorbent material of the invention, three clumping commercial cat litters, and one non-clumping commercial cat litter.

Hydration capacity is the ability of a solid matrix sample, such as a powder, to absorb liquid, using the formula hydration capacity=(weight of tube+hydrated sample)−(weight of tube) divided by dry sample weight. Hydration capacity data for the cat litter formulations were obtained using 0.5 g samples placed in 15 mL centrifuge tubes. Ten mL of deionized distilled $H_2O$ was added to each tube and the samples were shaken on an orbital shaker set at 250 rpm for 15 minutes. The tubes were then centrifuged for 15 minutes at 1000× gravity, the supernatant carefully removed with a Pasteur pipette with suction, and the tubes weighed. The hydration capacity was the weight of the tube and wet sample minus the weight of the tube divided by the dry sample weight, measured as g $H_2O$ per g dry matter.

Bulk densities were determined by introducing 100.0 g of the test sample, M, into a dry 100 mL graduated cylinder. The unsettled apparent volume, Vo, was measured to the nearest graduated unit. The bulk densities of the samples, in g per $cm^3$, were determined by the formula: M/Vo.

Dust formation by the litter formulations were determined using a PCE-PCO 2 Particle Counter (PCE Instruments, Meschede, Germany). Formation of airborne particles were measured by placing 10.0 g of each of the litters in solvent-cleaned, oven-dried capped 0.95 L glass jars (Fisher Scientific, Pittsburgh, Pennsylvania, USA), vigorously shaking the jars manually for 10 seconds, removing the cap, and placing the particle sensor at the opening. Data for all particles under 10.0 µm were collected; these are particles which are deemed harmful to human health if inhaled.

Clumping activity was determined by adding 5.0 g of each treatment into 57-mm aluminum weighing dishes (U.S. Plastic Corporation; Lima, Ohio, USA), then allowing 20.0 mL of water to drip into each plate from a 100 mL burette (Cole-Parmer; Vernon Hills, Illinois, USA) placed 9 mm above each plate. Plates were then placed in a drying oven set at 60° C. for 24 hours. The contents of each plate were then emptied onto a 4.75 mm sieve (which was sufficiently large to allow passage of all non-clumped material) and placed on an orbital shaker set at 300 rpm for 1 minute. Clumping percentage was calculated as follows: Clumping percentage=(Weight of clumps retained on sieve/5.0 g)×100%. CEDARIFIC is a non-clumping litter and therefore was not analyzed for this property. All samples were run in quadruplicate for all four physical characteristics. Statistical analyses were performed using Statistix 7 software (Analytical Software; Tallahassee, Florida, USA).

Five different cat litters were tested for their bulk density, hydration capacity, dust formation, and clumping ability. The results are shown in Table 2, below.

TABLE 2

Cat Litter Physical Properties

| | Bulk density$^a$ Kg/m$^3$ | Hydration capacity g H$_2$O/g | Dust Formation No. Particles | Clumping Percentage |
|---|---|---|---|---|
| Instant invention | 0.35 c | 4.73 a | 11,589 d | 4.57 a |
| WORLD'S BEST | 0.62 a | 3.93 c | 121,165 c | 3.74 c |
| FELINE PINE | 0.55 b | 4.30 b | 131,574 c | 4.02 b |
| OUR PET'S | 0.54 b | 4.68 a | 364,456 b | 4.62 a |
| CEDARIFIC | 0.24 d | 4.87 a | 443,007 a | n.a. |

$^a$Means within a column followed by the same letter are not significantly different based on differences of least square means at $p \le 0.05$.

The results above show that the dust formation (number of particles released) by a cat litter of the invention was much lower than that of any of the commercial cat litters tested. The dust formation of the litter of the invention was at least 10 times lower than that of WORLD'S BEST cat litter or of FELINE PINE cat litter; at least 30 times lower than that of OUR PET'S cat litter, and at least 38 times lower than that of the non-clumping CEDARIFIC cat litter. The bulk density of a cat litter of the invention was lower than that of all the commercial clumping cat litters tested (WORLD'S BEST; FELINE PINE; OUR PET'S), but slightly higher than that of the non-clumping cat litter tested (CEDARIFIC). The hydration capacity of the litter of the invention was similar to that of CEDARIFIC cat litter and OUR PET'S cat litter, and higher than that of FELINE PINE cat litter and WORLD'S BEST cat litter. The percentage clumping ability of the cat litter of the invention was similar to that of OUR PET'S cat litter, higher than that of FELINE PINE cat litter, and much higher than that of WORLD'S BEST cat litter.

Example 4

Odor Absorbance Vs Commercial Litters

The ability to absorb volatile compounds was determined for a cat litter of the invention, three clumping commercial cat litters, and one non-clumping commercial cat litter.

Figure 2:
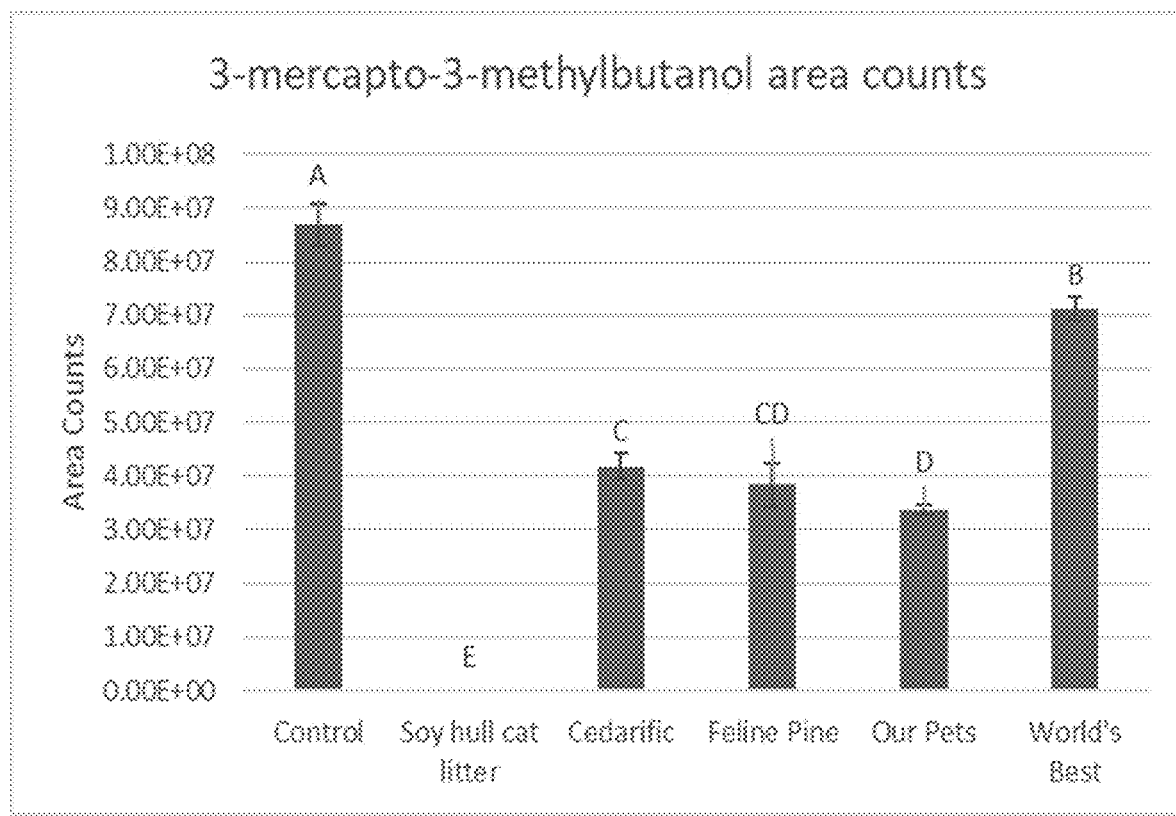
FIG. 2 depicts a graph of the volatile compound peak area counts for the cat litter of the invention and commercially-available cat litters. The Y axis indicates the peak area measured for the 3-mercapto-3-methylbutanol. The X axis indicates the samples. Control are ground soybean hulls without additional materials.

To determine the reduction of volatile 3-mercapto-3-methylbutanol by the different litters, headspace concentrations were analyzed using spiked SPME of samples, as described in Example 2. The results are shown in FIG. 2, and in Table 3, below.

TABLE 3

3-mercapto-3 methylbutanol Peak Areas

| Material | Peak Area |
|---|---|
| Control (Ground soybean hulls) | 8.8E+07 |
| Soybean Hull cat litter | 1.1E+05 |
| CEDARIFIC cat litter | 4.2E+07 |
| FELINE PINE cat litter | 3.8E+07 |
| OUR PET'S cat litter | 3.4E+07 |
| WORLD'S BEST cat litter | 7.1E+07 |

As seen in FIG. 2, and in Table 3, above, the cat litter of the invention absorbs almost all of the volatile 3-mercapto-3-methylbutanol. For the commercial cat litters, OUR PET'S cat litter shows the greatest amount of volatile reduction, followed closely by CEDARIFIC cat litter and FELINE PINE cat litter, with WORLD'S BEST cat litter far behind.

The ability to absorb volatile 3-mercapto-3-methylbutanol, was also measured for a clay cat litter, and ground soybean hulls as control. The experiment was repeated three times. The results are shown in Table 4, below.

TABLE 4

3-mercapto-3 methylbutanol Peak Areas

| Material | Peak Area |
|---|---|
| Control (Ground soybean hulls) | 4.1E+07 |
| Control (Ground soybean hulls) | 5.9E+07 |
| Control (Ground soybean hulls) | 4.4E+07 |
| Clay cat litter | 6.2E+06 |
| Clay cat litter | 2.3E+07 |
| Clay cat litter | 2.7E+07 |

The data in this example shows that the capacity to absorb odors by a cat litter of the invention is greater than any of the commercial cat litters tested. As seen in Table 3 and Table 4, the 3-mercapto-3-methylbutanol peak area for a litter of the invention was 1.1 E+05, while that for commercial clay cat litters was at least 2.3 E+07, and the peak area for commercial biobased cat litters was at least 3.4 E+07.

Example 5

Microbial Growth on Materials of the Invention

The ability of the Soybean Hull Biochar Clumping Cat Litter (SBH) and the Soybean Hull/Soybean Hull Biochar Clumping Cat Litter Formulation (SBH+) to stop the growth of bacteria was analyzed.

SBH (Soybean Hull Biochar Clumping Cat Litter) and SBH+(Soybean Hull/Soybean Hull Biochar Clumping Cat Litter Formulation) were sterilized by placing 1 g of each substrate into 50 ml Delong Erlenmeyer flasks with 1 ml of ultrapure water, and autoclaving at 121° C. for 15 minutes with a stainless-steel flask closure to allow air exchange.

The substrates were tested for their ability to support fungal growth of *Penicillium chrysogenum* NRRL 807, *Rhizopus* microspores NRRL B-738, *R. oligosporus* NRRL B-2958, *R. oryzae* NRRL 395, and *Aspergillus niger* NRRL 326. This was done by adding 3 ml of either sterile water or simulated cat urine (1.8 g/L creatinine, 84 g/L urea, 9.0 g/L ammonium acetate, 0.6 g/L magnesium chloride, 14.1 g/L potassium phosphate, dibasic) to the sterile substrate.

Simulated cat urine was formulated based on common feline reference values for urine composition taught by Y. H.

Cottam et al. (2002, "Feline Reference Values for Urine Composition," J. Nutr. 132 (6): 1754S-1756S). Fungal spore suspensions (100 µl of $10^5$ to $10^6$ spores per ml) obtained from cultures grown 7 to 10 days on potato dextrose agar were then inoculated on to the substrate and incubated 7 days at 26° C. No visible fungal growth was detected on substrate moistened with either water or simulated cat urine.

The ability to support bacterial growth was performed with substrate sterilized in the same manner. A bacterial inoculum was prepared at a concentration of 0.5 McFarland units using 1× phosphate buffered saline (PBS) with culture of *Escherichia coli* ATCC 25922, *Pseudomonas aeruginosa* ATCC 27853, and *Staphylococcus aureus* ATCC 29213 grown two days at 37° C. on LB medium. This inoculum was diluted 1:100 into simulated cat urine, applied to substrate (3 ml/flask), and incubated at 37° C. for 3 days.

At the end of the incubation, triplicate flasks of each substrate for each isolate were flooded with 10 ml 1×PBS and mixed at 4° C./300 rpm for 30 minutes to recover the bacteria. Sample (1 ml) was removed from each flask and diluted 1:10 sequentially for final dilutions of 1:100 and 1:1000 in 1×PBS. The dilutions were plated onto LB agar medium using an Eddy Jet Spiral Plate spreader (Neutec Group, Inc.; Farmingdale, New York, USA). Plates were incubated for 2 days at 37° C., and counted using a FLASH & GO automated colony counter (Neutec Group, Inc.). The initial load of bacteria (Time=0) was determined by inoculating and immediately processing the substrate as described above.

Figure 3:
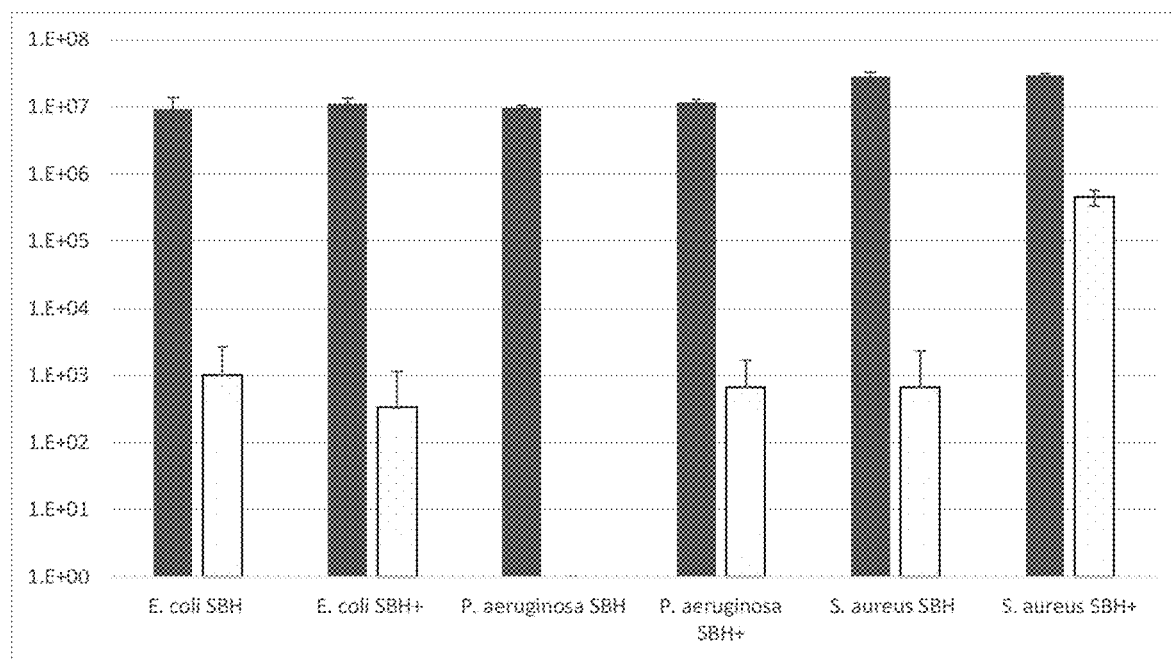
FIG. 3 depicts a graph of bacterial survival in soybean Hull Biochar Clumping Cat Litter (SBH) and in Soybean Hull/Soybean Hull Biochar Clumping Cat Litter Formulation (SBH+). Gray bars indicate the initial load at time 0; and white bars indicate the bacterial counts after 3 day incubation. Y axis presents the bacterial counts, and the X axis presents the different bacteria. Soybean Hull Biochar (SBH); Soybean Hull Biochar/Soybean Hull Biochar Formulation (SBH+).

Depending on the strain, the initial bacterial load was determined to be between 1.0 $10^7$ and 2.9×$10^7$ bacteria per gram of substrate. As seen in FIG. 3, bacterial counts decreased by approximately 2-6 logs after 3 days, confirming that the substrate does support growth of these common bacteria. SBH was much more effective at reducing bacterial counts for *P. aeruginosa* and *S. aureus* when compared to SBH+. However, this observation has minimal impact on the overall effectiveness of these substrates for reducing bacterial concentrations.

This example shows that without the addition of antimicrobial agents, a cat litter of the invention reduces microbial growth, preventing microbes in the waste to multiply and cause foul odors.

We claim:

1. A biodegradable absorbent material comprising ground soybean hulls, soybean hull biochar, and at least one binding agent, and optionally comprising at least one of a clumping agent, an odor-absorbing agent, or a mixture thereof,
    wherein the binding agent is at least one of mineral oil, beeswax, castor oil, avocado oil, grapeseed oil, or a combination thereof, and
    wherein the clumping agent is at least one of guar gum, Xanthan gum, tara gum, a hydrocolloid gum, sodium alginate, a latex, a starch, corn syrup, corn syrup solids, *psyllium* husk, chia seeds, flax seed meal, cornstarch, gelatin, agar agar, konjac powder, or a combination thereof.

2. The absorbent material of claim 1, wherein the odor-absorbing agent is at least one of baking soda, hexadecyl ammonium chloride amylose inclusion complex, or mixtures thereof.

3. An article of manufacture prepared with the absorbent material of claim 1.

4. The article of manufacture of claim 3, wherein the article of manufacture is a sock, a pillow, a spill mat, a spill pad, an industrial rug, a roll, a boom, a small pet bedding material, or a cat litter.

5. The article of manufacture of claim 4, wherein the article of manufacture is formed into pellets, sawdust, or briquettes.

6. The article of manufacture of claim 4, wherein the small pet bedding material or cat litter comprises from greater than about 0% to about 30% soybean hulls, from greater than about 0% to about 60% soybean hull biochar, from greater than about 0% to about 10% of a binding agent, from about 0% to about 10% of a clumping agent, and from about 0% to about 5% odor-absorbing agent.

7. The article of manufacture of claim 6, wherein the odor-absorbing agent is baking soda or hexadecyl ammonium chloride amylose inclusion complex.

8. The article of manufacture of claim 6, wherein the binding agent is mineral oil, the clumping agent is guar gum, and the odor-absorbing agent is hexadecyl ammonium chloride amylose inclusion complex.

9. The article of manufacture of claim 8, wherein the article of manufacture is cat litter.

10. A method for preparing a biodegradable absorbent material, the method comprising:
    mixing ground soybean hulls with soybean hull biochar and a binding agent, wherein the binding agent is at least one of mineral oil, beeswax, castor oil, avocado oil, grapeseed oil, or a combination thereof.

11. The method of claim 10, further comprising adding at least one of a clumping agent, an odor-absorbing agent, or mixtures thereof; wherein the clumping agent is at least one of guar gum, Xanthan Qum, tara gum, a hydrocolloid gum, sodium alginate, a latex, a starch, corn syrup, corn syrup solids, *psyllium* husk, chia seeds, flax seed meal, cornstarch, gelatin, agar agar, konjac powder, or a combination thereof.

12. The method of claim 11, wherein the method comprises adding from greater than about 0% to about 30% soybean hulls, from greater than about 0% to about 60% soybean hull biochar, from greater than about 0% to about 10% of a binding agent, from about 0% to about 10% of a clumping agent, and from about 0% to about 5% of an odor-absorbing agent.

13. The method of claim 11, wherein the clumping agent added is at least one of guar gum, Xanthan gum, *psyllium* husk, chia seeds, flax seed meal, cornstarch, gelatin, agar agar, konjac powder, or mixtures thereof; and the odor-absorbing agent added is at least one of baking soda, hexadecyl ammonium chloride amylose inclusion complex, or mixtures thereof.

14. The method of claim 12, wherein the binding agent added is mineral oil, the clumping agent added is guar gum, and the odor-absorbing agent added is hexadecyl ammonium chloride amylose inclusion complex.

* * * * *